3,081,179
GLASS FIBER COMPOSITION
Fedia R. Charvat, Williamsville, and A. Daniel Fentzke, Lewiston, N.Y., assignors to Union Carbide Corporation, a corporation of New York
No Drawing. Filed May 29, 1961, Ser. No. 113,121
8 Claims. (Cl. 106—50)

This invention relates to the manufacture of glass fibers and to a composition especially suitable as glass fiber material.

Glass fiber, e.g. glass wool, is a material of known utility which is presently manufactured from molten glass by various methods and techniques. One such method comprises blasting a stream of molten glassy material with pressurized gas to high velocity whereby small bodies or globules of molten material are developed and attenuated into fibers. A particular fiber-forming process which employs centrifugal force to deliver bodies of molten glass into an attenuating gaseous stream is disclosed in U.S. Patent 2,609,566 to Slayter and Stalego.

The globules of molten material, upon being subjected to an attenuating force, are caused to elongate into fibers, rapidly losing heat and increasing in viscosity during elongation, until the glass reaches a temperature at which it is essentially rigid. The extent to which the molten globules of glass are elongated depends not only upon the initial viscosity of the molten material, but also upon the increase in viscosity with decrease in temperature since elongation of the glass at viscosities greater than about 200 poises is not found to be commercially practical. That is, it is most important, in order to produce long fibers, that the molten material maintain a relatively low viscosity, i.e. between about 5 and 200 poises, throughout a relatively large reduction in temperature. When such a fiber-forming material is provided, relatively long and high quality fibers can be readily formed with increased efficiency in an attenuating operation.

Accordingly, it is an object of the present invention to provide an improved process for the production of glass fibers wherein glass fibers can be produced over a relatively large temperature range.

It is another object to provide a process for the production of long, high quality glass fibers.

It is a further object to provide a material which is especially suitable for the manufacture of glass wool.

It is another object to provide a high quality glass wool formed of long fibers.

These and other objects will be apparent from the following description and claims.

The present invention is based upon the discovery that the presence of from about 3 to about 20 percent MnO in certain alumino-silicate glass compositions, described hereinbelow, renders such alumino-silicate compositions especially suitable in the manufacture of glass fibers, and further, an improved glass wool product is also obtained. The MnO-containing alumino-silicate compositions in accordance with the present invention are set forth in the following Table I.

TABLE I

| Ingredients: | Proportion, weight percent |
|---|---|
| $SiO_2$ | 30 to 48 |
| $Al_2O_3$ | 13 to 34 |
| CaO | 15 to 25 |
| MgO | 0 to 12 |
| MnO | 3 to 20 |

In the composition disclosed in Table I, BaO can be substituted for CaO in whole or in part.

It has been found that the above-described composition, while possessing superior fiber-forming properties, can nevertheless be melted and attenuated by conventional techniques. The compositions described in Table I are characterized, in the molten state, by having viscosities of 5 poises and 200 poises separated by at least about 100° C. with certain specific compositions having 5 poises and 200 poises separated by more than 300° C. Thus, when compositions in accordance with the present invention are employed in fiber-forming processes, relatively long resilient fibers are readily obtained since the molten material maintains a relatively low viscosity during a relatively large decrease in temperature. This characteristic property is illustrated in the following examples.

*Example I*

| Ingredients: | Proportion, weight percent |
|---|---|
| $SiO_2$ | 34.19 |
| $Al_2O_3$ | 24.82 |
| CaO+BaO | 16.52 |
| MgO | 6.58 |
| MnO | 12.93 |
| Incidental impurities | Bal. |
| 5 poise temperature | ° C__ 1480 |
| 200 poise temperature | ° C__ 1240 |
| Interval | ° C__ 240 |

*Example II*

| Ingredients: | |
|---|---|
| $SiO_2$ | 39.69 |
| $Al_2O_3$ | 27.00 |
| CaO+BaO | 16.51 |
| MgO | 5.35 |
| MnO | 7.5 |
| Incidental impurities | Bal. |
| 5 poise temperature | ° C__ 1600 |
| 200 poise temperature | ° C__ 1270 |
| Interval | ° C__ 330 |

*Example III*

| Ingredients: | |
|---|---|
| $SiA_2$ | 33.15 |
| $Al_2O_3$ | 29.12 |
| CaO+BaO | 23.01 |
| MgO | 10.22 |
| MnO | 3.34 |
| Incidental impurities | Bal. |
| 5 poise temperature | ° C__ 1580 |
| 200 poise temperature | ° C__ 1270 |
| Interval | ° C__ 310 |

The above glass compositions are especially adapted for use in the manufacture of glass wool. Extended ranges of temperature at which the molten material can be attenuated are made possible by the glass compositions disclosed with the result that high quality glass wool is produced. In contrast to the glass compositions of the present invention, those alumino-silicate glasses containing a lesser amount of alumina (below 13 percent) are not benefitted by the addition of MnO, and in fact are adversely affected thereby.

In the manufacture of glass wool in accordance with the present invention a material having a composition as set forth in Table I is heated to provide molten material at a viscosity of about 5 poises, and the molten material is then attenuated, for example, by means of pressurized air. The air stream causes elongation of globules of molten material into fibers which become essentially rigid after the viscosity increases to above 200 poises. The molten material experiences a change in temperature of 100° C. or more during the increase in viscosity from 5 poises to 200 poises.

The glass wool produced in the practice of the present invention is possessed of long, resilient fibers which remain substantially unaffected during continued exposure to atmospheric conditions.

On the other hand, alumino-silicate materials not in accordance with the present invention, have been found to have rather serious deficiencies with respect to the manufacture of glass wool. For example, compositions having greater amounts of CaO and lesser amounts of MnO (42 percent CaO, 12 percent $Al_2O_3$, 25 percent $SiO_2$, 8 percent MgO, 1.5 percent $Fe_2O_3$, 0.5 percent MnO) have been found to produce short brittle fibers which, under exposure to atmospheric conditions, became less resilient and slowly disintegrate.

Other compositions having greater amounts of $Al_2O_3$ and lesser amounts of MnO (30 percent $Al_2O_3$, 35 percent $SiO_2$, 8 percent MgO, 25 percent CaO, 2 percent $Fe_2O_3$+MnO), are characterized by high melting points and high viscosity.

The glass wool product of the present invention is characterized by being formed of resilient, corrosion resistant fibers. A very high degree of resiliency and superior resistance to alkali and dilute acid solutions are combined in the glass wool product of the present invention. Additionally, glass wool products of the present invention are formed of relatively long fibers, e.g. 10 to 12 inches or more.

What is claimed is:

1. In a process for the production of glass fibers by attenuating bodies of molten glassy material, the improvement which comprises employing as the molten material an alumino-silicate composition consisting essentially of from about 30 to about 48 percent $SiO_2$, from about 13 to about 34 percent $Al_2O_3$, from about 15 to about 25 percent in the aggregate of CaO and BaO, up to about 12 percent MgO, and from about 3 to about 20 percent MnO.

2. A process in accordance with claim 1 wherein said molten material is an alumino-silicate composition consisting essentially of about 34 percent $SiO_2$, 25 percent $Al_2O_3$, 17 percent in the aggregate of CaO and BaO, 7 percent MgO, and 13 percent MnO with the balance being incidental impurities.

3. A process in accordance with claim 1 wherein said molten material is an alumino-silicate composition consisting essentially of about 40 percent $SiO_2$, 25 percent $Al_2O_3$, 17 percent in the aggregate of CaO and BaO, 5 percent MgO, and 7.5 percent MnO with the balance being incidental impurities.

4. A process in accordance with claim 1 wherein said molten material is an alumino-silicate composition consisting essentially of about 33 percent $SiO_2$, 29 percent $Al_2O_3$, 23 percent in the aggregate of CaO and BaO, 10 percent MgO, and 3.3 percent MnO with the balance being incidental impurities.

5. As an article of manufacture, resilient, corrosion-resistant attenuated glass fibers consisting essentially of from about 30 to about 48 percent $SiO_2$, from about 13 to about 34 percent $Al_2O_3$, from about 15 to about 25 percent in the aggregate of CaO and BaO, up to about 12 percent MgO, and from about 3 to about 20 percent MnO.

6. As an article of manufacture, resilient, corrosion-resistant attenuated glass fibers consisting essentially of about 34 percent $SiO_2$, 25 percent $Al_2O_3$, 17 percent in the aggregate of CaO and BaO, 7 percent MgO, and 13 percent MnO with the balance being incidental impurities.

7. As an article of manufacture, resilient, corrosion-resistant attenuated glass fibers consisting essentially of about 40 percent $SiO_2$, 27 percent $Al_2O_3$, 17 percent in the aggregate of CaO and BaO, 5 percent MgO, and 7.5 percent MnO with the balance being incidental impurities.

8. As an article of manufacture, resilient, corrosion-resistant attenuated glass fibers consisting essentially of about 33 percent $SiO_2$, 29 percent $Al_2O_3$, 23 percent in the aggregate of CaO and BaO, 10 percent MgO, and 3.3 percent MnO with the balance being incidental impurities.

References Cited in the file of this patent

UNITED STATES PATENTS

| | | |
|---|---|---|
| 2,199,856 | Partridge | May 7, 1940 |
| 2,576,312 | Minnick | Nov. 27, 1951 |
| 2,733,158 | Tiede | Jan. 31, 1956 |
| 3,013,888 | Lajarte | Dec. 19, 1961 |